US010060613B2

(12) United States Patent
Qin et al.

(10) Patent No.: US 10,060,613 B2
(45) Date of Patent: Aug. 28, 2018

(54) OUTDOOR LASER LAMP

(71) Applicant: Ningbo Huadian Envirotech Co., Ltd., Ningbo (CN)

(72) Inventors: Bing Qin, Ningbo (CN); Dejun Jiang, Ningbo (CN); Meixing Cai, Ningbo (CN)

(73) Assignee: Ningbo Huadian Envirotech Co., Ltd., Ningbo (CN)

( * ) Notice: Subject to any disclaimer, the term of this patent is extended or adjusted under 35 U.S.C. 154(b) by 391 days.

(21) Appl. No.: 14/898,039

(22) PCT Filed: Aug. 14, 2015

(86) PCT No.: PCT/CN2015/000589
§ 371 (c)(1),
(2) Date: Dec. 11, 2015

(87) PCT Pub. No.: WO2016/119091
PCT Pub. Date: Aug. 4, 2016

(65) Prior Publication Data
US 2016/0369996 A1 Dec. 22, 2016

(30) Foreign Application Priority Data
Jan. 30, 2015 (CN) ..................... 2015 2 0069169 U

(51) Int. Cl.
*B60Q 1/06* (2006.01)
*F21V 29/00* (2015.01)
(Continued)

(52) U.S. Cl.
CPC .............. *F21V 31/03* (2013.01); *F21S 8/081* (2013.01); *F21V 21/0824* (2013.01);
(Continued)

(58) Field of Classification Search
CPC .. F21S 8/081; F21S 8/083; F21S 8/032; F21S 6/00; F21S 6/004; F21V 31/03;
(Continued)

(56) References Cited

U.S. PATENT DOCUMENTS 6,283,600 B1 * 9/2001 Levasseur ............... F21V 17/02 353/119
6,953,267 B1 * 10/2005 Cunningham ............ F21V 3/00 362/158
(Continued)

*Primary Examiner* — Erin Kryukova
(74) *Attorney, Agent, or Firm* — Wang Law Firm, Inc.

(57) ABSTRACT

An outdoor laser lamp includes a housing, a laser and a circuit board disposed inside the housing, and a lower mounting plate. A periphery of the lower mounting plate is in contact with an inner wall of the housing, a laser and a circuit board are located between the lower mounting plate and the top of the housing. Air vents are on the bottom of the housing; through holes are on the lower mounting plate, a raised ring wall surrounds each through hole and extends towards the bottom of the housing. The laser lamp realizes air circulation between outside air and the interior of the housing, realizes rapid heat dispersion of the laser lamp to ensure the functionality of the laser lamp. Additionally, it prevents water entering the space where the circuit board is arranged, to avoid the influence on the internal circuits by water.

5 Claims, 2 Drawing Sheets

(51) Int. Cl.

| | |
|---|---|
| ***B60Q 1/00*** | (2006.01) |
| ***B60Q 3/00*** | (2017.01) |
| ***F21V 11/00*** | (2015.01) |
| ***F21S 8/00*** | (2006.01) |
| ***F21S 13/10*** | (2006.01) |
| ***G02B 27/20*** | (2006.01) |
| ***F21V 31/03*** | (2006.01) |
| ***F21S 8/08*** | (2006.01) |
| ***F21V 21/08*** | (2006.01) |
| *F21V 29/508* | (2015.01) |
| *F21V 29/67* | (2015.01) |
| *F21Y 115/30* | (2016.01) |
| *F21V 21/30* | (2006.01) |
| *F21V 23/04* | (2006.01) |
| *F21W 131/10* | (2006.01) |
| *F21V 29/507* | (2015.01) |

(52) U.S. Cl.
CPC ............... *F21V 21/30* (2013.01); *F21V 23/04* (2013.01); *F21V 29/507* (2015.01); *F21V 29/508* (2015.01); *F21V 29/67* (2015.01); *F21W 2131/10* (2013.01); *F21Y 2115/30* (2016.08)

(58) Field of Classification Search
CPC .... F21V 21/0824; F21V 21/30; F21V 29/507; F21V 29/67; F21V 29/508; F21V 23/04; F21V 23/33; F21V 23/0433; F21W 2131/10; F21W 2131/107; F21W 2131/109; F21Y 2115/30; G02B 21/2033
See application file for complete search history.

(56) References Cited

U.S. PATENT DOCUMENTS

| | | | | |
|---|---|---|---|---|
| 8,388,197 | B1 * | 3/2013 | Huang | F21V 29/83 362/218 |
| 8,939,600 | B1 * | 1/2015 | Beadle | F21V 31/04 362/158 |
| 2002/0101571 | A1 * | 8/2002 | Panasewicz | F21V 21/0824 353/119 |
| 2006/0181883 | A1 * | 8/2006 | Hsu | F21V 1/00 362/373 |
| 2009/0027900 | A1 * | 1/2009 | Janos | F21V 21/0824 362/373 |
| 2009/0185377 | A1 * | 7/2009 | Johnson | F21V 21/0824 362/259 |
| 2010/0219775 | A1 * | 9/2010 | Maglica | F21L 4/045 315/362 |
| 2011/0037368 | A1 * | 2/2011 | Huang | F21V 29/02 313/46 |
| 2015/0159842 | A1 * | 6/2015 | Zhang | F21V 21/30 362/231 |

* cited by examiner

OUTDOOR LASER LAMP

RELATE APPLICATIONS

This application is a national phase entrance of and claims benefit to PCT Application for an outdoor laser lamp, PCT/CN2015/000589, filed on Aug. 14, 2015, which claims benefit to Chinese Patent Application 201520069169.2, filed on Jan. 30, 2015. The specifications of both applications are incorporated here by this reference.

FIELD OF THE INVENTION

The present invention relates to an outdoor laser lamp having a cooling function.

DESCRIPTION OF THE PRIOR ART

Outdoor laser lamps are the first choice for scene decoration in outdoor activities. However, the outdoor laser lamps must be waterproof as they are to be used outdoor. At present, the outdoor laser lamps mostly employ the design of a fully-closed housing mechanism in order to be waterproof. However, during operation of a laser lamp of such a structure, heat generated by a laser head can not be dispersed effectively, and the temperature in the interior of the housing thus increases continuously. As a result, the laser head will have serious light attenuation.

A Chinese Patent CN202253498U (Patent Number: 201120341303.1), titled “Outdoor Laser Lamp”, disclosed an outdoor laser lamp, where an L-shaped cladding panel is provided on the outside of cooling holes, thus to prevent rainwater from entering the interior of the laser lamp while ensuring the cooling effect. However, once rainwater splashes into the cooling holes or flows into the cooling holes from a mounting clearance between an upper shield and the cladding panel, a circuit board will be easily influenced by rainwater. Another Chinese Patent CN201748379U (Patent Number: 201020272325.2), titled “Waterproof Laser Lamp”, disclosed a laser lamp which realizes the waterproof function by an additional waterproof shield. However, the manufacture cost is high. Additionally, such a laser lamp separates cooling fins from other structures by a heat conducting spacer. The arrangement of the heat conducting spacer limits the region of air circulation even though there are air vents provided on the bottom of the housing. As a result, the cooling effect is limited to a certain extent.

SUMMARY OF THE INVENTION

A technical problem to be solved by the present invention is, in view of the prior art, to provide an outdoor laser lamp having excellent ventilating and cooling effects and being capable of preventing water from entering the interior of the laser lamp.

To solve this technical problem, the outdoor laser lamp comprises a housing having a top, a bottom and an opening on the top; a laser and a circuit board both disposed inside the housing; a cover body covering on the opening of the housing, the cover body has a transparent center for laser light from the laser to pass through, wherein, a lower mounting plate is disposed inside the housing, and a periphery of the lower mounting plate is hermetically in contact with an inner wall of the housing; the laser and the circuit board are located between the lower mounting plate and the cover body; a plurality of air vents are provided on the bottom of the housing; a plurality of through holes are provided on the lower mounting plate, and a raised ring wall surrounds each through hole and extends towards the bottom of the housing.

As a preference to the ventilation in the interior of the laser lamp, multiple air vents distributed along the periphery of the bottom of the housing.

Preferably, there are at least two through holes.

In order to cover the air vents thus to prevent rainwater falling down from entering the interior of the laser lamp to the maximum extent, the cover body includes a transparent cover and a compression ring compressed against the transparent cover; and a flange is provided at the top of the housing, the flange extends radially away from the top of the housing, and the compression ring is pressed against the flange.

In order to facilitate the air circulation in the interior of the laser lamp thus to improve the cooling effect, a fan, adjacent to the laser, is disposed inside the housing.

For ease of mounting, an upper mounting plate is disposed under the cover body, and a light guiding hole matching with a light outlet of the laser is provided on the upper mounting plate; a first side mounting plate and a second side mounting plate are attached to the bottom of the upper mounting plate, the laser is mounted on the first side mounting plate and the fan is mounted on the second side mounting plate.

In order to turn on the laser lamp conveniently and prevent water from entering from where it is turned on, a switch is connected to the circuit board, and a switch hole for the switch to pass through is provided on the lower mounting plate; a switch cover is wrapped outside the switch, the switch cover is movably mounted on the lower mounting plate through a mounting piece, and a switch cover hole for the switch cover to pass through is provided on the bottom of the housing.

In order to adjust the irradiation direction of the laser conveniently, a rotatable mounting rod is connected to the bottom of the housing.

DETAILED DESCRIPTION OF THE PREFERRED EMBODIMENT

Figure 1:
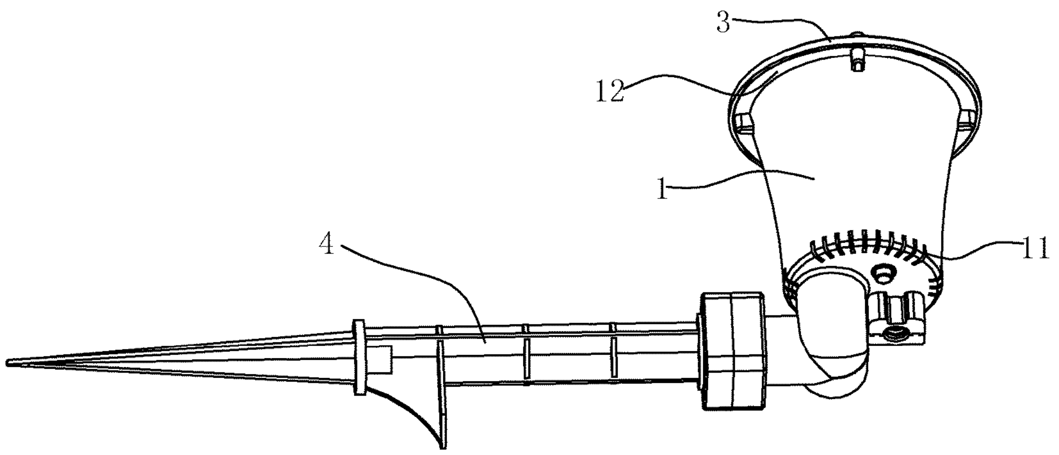
FIG. 1 is a perspective view of the outdoor laser lamp according to an embodiment of the present invention.
Figure 2:
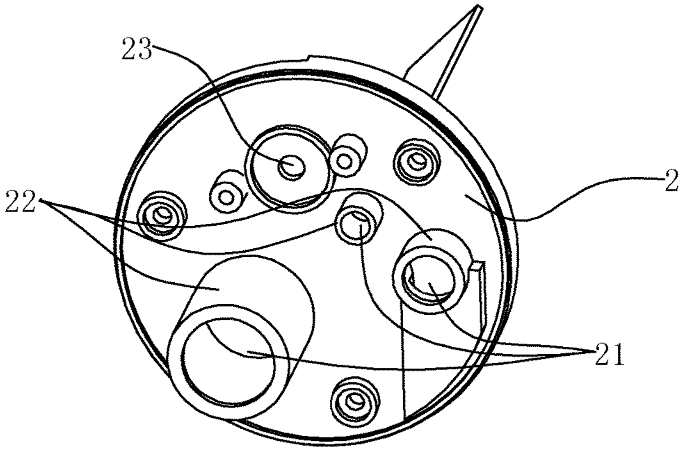
FIG. 2 is a perspective view of a lower mounting plate according to the embodiment of the present invention.
Figure 3:
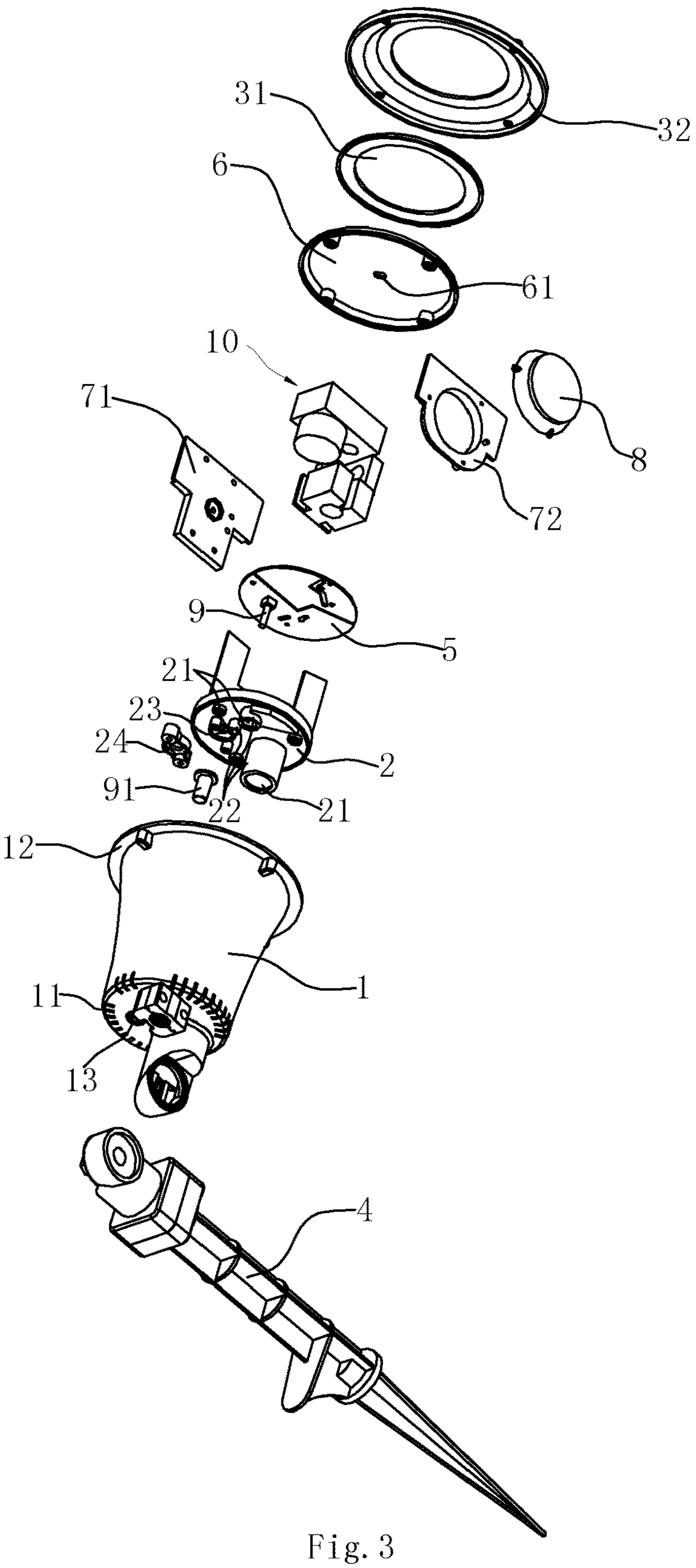
FIG. 3 is an exploded view of the outdoor laser lamp according to the embodiment of the present invention.

To enable a further understanding of the present invention content of the invention herein, refer to the detailed description of the invention and the accompanying drawings below:

FIG. 1-FIG. 3 show a preferred embodiment of the outdoor laser lamp. The outdoor laser lamp comprises a housing 1, a laser 10, a circuit board 5, a fan 8 and a lower mounting plate 2 all disposed inside the housing 1.

To adjust the irradiation angle of the laser lamp conveniently, a rotatable mounting rod 4 is connected to the bottom of the housing 1.

The periphery of the lower mounting plate 2 is hermetically in contact with an inner wall of the housing 1, the lower mounting plate 2 partitions the housing 1 into two spaces, and the laser 10, the circuit board 5 and the fan 8 are disposed inside the housing 1. The laser, the circuit board 5 and the fan 8 are located between the lower mounting plate 2 and the cover body 3.

An upper mounting plate 6 is disposed under the cover body 3, and a light guiding hole 61 matching with a light outlet of the laser is provided on the upper mounting plate 6.

A first side mounting plate 71 and a second side mounting plate 72 are attached to the bottom of the upper mounting plate 6, the laser 10 is mounted on the first side mounting plate 71 and the fan 8 is mounted on the second side mounting plate 72 and is adjacent to the laser 10.

A switch 9 is connected to the circuit board 5, and a switch hole 23 for the switch 9 to pass through is provided on the lower mounting plate 2.

A switch cover 91 is wrapped outside the switch 9, the switch cover 91 is movably mounted on the lower mounting plate 2 through a mounting piece 24, and a switch cover hole 13 for the switch cover 91 to pass through is provided on the bottom of the housing 1. After mounting, the switch 9 extends from the switch hole 23 and the switch cover hole 13 to the bottom of the housing 1, the switch cover 91 is wrapped outside the switch 9 and extends from the switch cover hole 13 to the bottom of the housing 1, the switch 9 may be actuated by pressing or rotating the switch cover 91 thus to turn on or off the outdoor laser lamp.

Multiple air vents 11 are distributed along the periphery of the bottom of the housing 1. In this case, outside air is allowed to enter the interior of the housing 1 from a plurality of directions, so that the ventilation in the interior of the housing 1 becomes better.

In order to cover the air vents 11 thus to prevent rainwater from falling into the air vents 11 to the maximum extent, a cover body 3 having a transparent center for laser light from the laser 10 to pass through, covers the opening of the housing 1. The cover body 3 includes a transparent cover 31 and a compression ring 32 compressed against the transparent cover 31. A flange 12 is provided at the top of the housing 1, the flange extends radially away from the top of the housing, and the compression ring 32 is pressed against the flange 12. In this case, the periphery of the cover body 3 and the flange 12 on the top of the housing 1 can protect the air vents 11, thus to prevent rainwater from entering the air vents 11 effectively.

Additionally, the lower mounting plate 2 can be made of material having excellent heat dispersion effect, and the circuit board 5 is disposed under the lower mounting plate 2, in order to disperse heat generated by the circuit board 5 rapidly, thus to ensure the working stability of the circuit board 5.

Additionally, at least two through holes 21 are provided on the lower mounting plate 2, and a raised ring wall 22 surrounds each through hole 21 and extends towards the bottom of the housing 1. Sufficient air circulation in the interior of the housing 1 of the laser lamp can be completely realized by the air vents 11 and the through holes 21, thereby ensuring that heat in the interior of the laser lamp can be dispersed rapidly. Meanwhile, the air circulation can be facilitated by turning on the fan 8. Increasing the cooling speed effectively ensures the normal working of the laser lamp.

Additionally, in a case where outside rainwater splashes into the air vents 11 by accident or the laser lamp falls off to be exposed to rainwater, a small amount of rainwater will enter the housing 1 from the air vents 11. The arrangement of the raised ring wall 22 on the lower mounting plate 2 can absolutely prevent rainwater from further entering the though holes 21, thus to prevent rainwater from entering a space where the laser 10 and the circuit board 5 are arranged. As a result, the influence on internal circuits of the laser lamp by rainwater is avoided effectively, and the laser lamp can still work normally even though water has entered the housing 1 of the laser lamp. The laser lamp of the present invention is highly practical.

Compared with the prior art, in the present invention, the outdoor laser lamp can realize air circulation between outside air and the entire interior of the housing by the air vents and the through holes provided on the lower mounting plate, and can realize rapid hear dispersion of the laser lamp thus to ensure the normal working of the laser lamp. Additionally, the raised ring wall arranged on the lower mounting plate can effectively prevent water, entering the housing from the air vents by accident, from entering the space where the circuit board is arranged, thus to avoid the influence on the internal circuits of the laser lamp by water; and the structure is rational and practical.

The invention claimed is:

1. An outdoor laser lamp, comprising a housing having a top, a bottom and an opening on the top;

a laser and a circuit board both disposed inside the housing;

a fan disposed inside the housing adjacent to the laser;

a cover body disposed outside the housing to cover the opening of the housing, the cover body having a transparent center for laser light from the laser to pass through, wherein, a lower mounting plate is disposed inside the housing, and a periphery of the lower mounting plate is hermetically in contact with an inner wall of the housing;

an upper mounting plate is disposed under the cover body and a light guiding hole matching with a light outlet of the laser is provided on the upper mounting plate;

the laser and the circuit board are located between the lower mounting plate and the cover body;

a plurality of air vents are provided on the bottom of the housing;

a plurality of through holes are provided on the lower mounting plate, and a raised ring wall surrounds each through hole and extends towards the bottom of the housing; and a first side mounting plate and a second side mounting plate are attached to a bottom of the upper mounting plate, the laser is mounted on the first side mounting plate and the fan is mounted on the second side mounting plate.

2. The laser lamp of claim 1, wherein the plurality of air vents is distributed along the periphery of the bottom of the housing.

3. The laser lamp of claim 1, wherein the cover body includes a transparent cover and a compression ring compressed against the transparent cover; and a flange is provided at the top of the housing, the flange extends radially away from the top of the housing, and the compression ring is pressed against the flange.

4. The laser lamp of claim 1, wherein a switch is connected to the circuit board, and a switch hole for the switch to pass through is provided on the lower mounting plate;

a switch cover is wrapped outside the switch, the switch cover is movably mounted on the lower mounting plate through a mounting piece, and a switch cover hole for the switch cover to pass through is provided on the bottom of the housing.

5. The laser lamp of claim 1, wherein a rotatable mounting rod is connected to the bottom of the housing.

* * * * *